Figure 1:
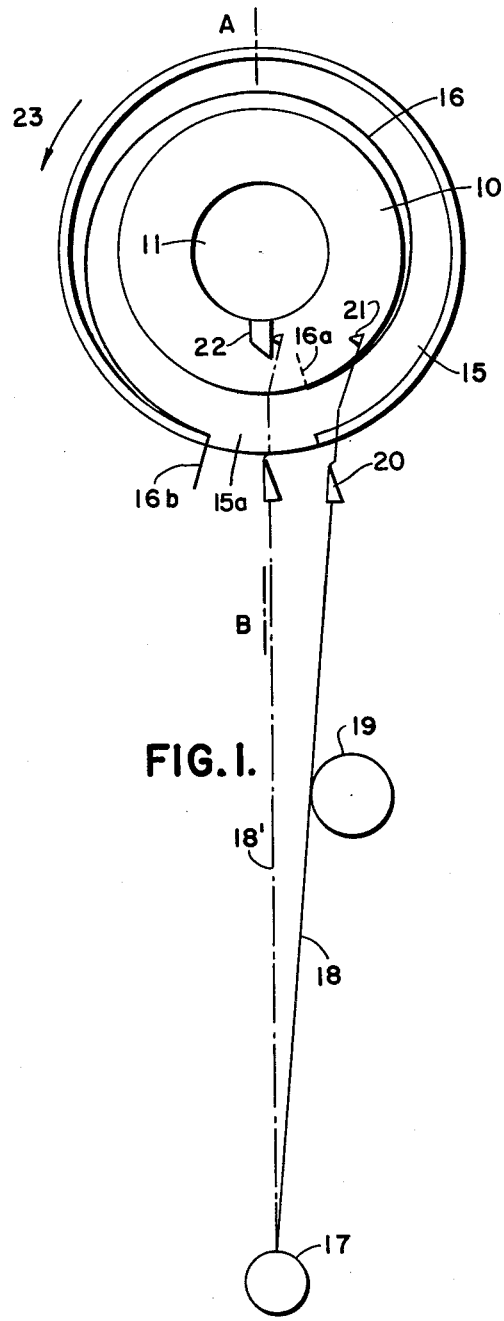

Oct. 30, 1962    H. EPPERLEIN    3,060,676
CONTACT SYSTEM FOR ELECTRIC WATCHES
Filed Jan. 9, 1959

INVENTOR
*Helmut Epperlein*

BY *Diggins & LeBlanc*
ATTORNEYS

United States Patent Office 3,060,676
Patented Oct. 30, 1962

3,060,676
CONTACT SYSTEM FOR ELECTRIC WATCHES
Helmut Epperlein, Ersingen, near Pforzheim, Germany, assignor to Hamilton Watch Company, Lancaster, Pa., a corporation of Pennsylvania
Filed Jan. 9, 1959, Ser. No. 785,832
4 Claims. (Cl. 58—28)

This invention relates to a battery operated electric watch of the type having a coil periodically energized through a contact system associated with balance staff and more particularly relates to an improved contact system.

In certain types of known electric watches, a coil carried by the balance wheel is periodically connected to a source of electrochemical power through a contact system which is actuated by the motion of the balance wheel. At the time that the coil is connected to this source of electrochemical energy, it is passing through a magnetic field so that the field induced in the coil reacts with the magnetic field and impulses the balance wheel to drive an indexing system which is connected to drive the gear train of the watch. It has also been proposed to utilize a similar type of contact system in connection with a stationary coil which is periodically energized as a magnetic member carried by the balance staff passes through pre-determined positions.

A contact system suited for use in either of the foregoing arrangements must provide sure and reliable contact over an accurately predetermined arc of rotation of the balance staff and must provide a quick circuit break with a minimum of arcing.

According to the present invention a contact system is provided which comprises a pair of coacting springs, one carried by the balance staff and the other carried by the watch frame or pillar plate. The spring carried by the pillar plate has a cam attached thereto which cooperates with the spring carried by the balance staff. The spring mounted on the pillar plate also carries a contact which is adapted to cooperate with a contact carried by the balance staff.

As the balance staff oscillates in one direction, the spring carried thereby engages the cam to merely move the pillar plate mounted spring out of the path of movement of the contact carried by the balance staff. As the balance staff oscillates in the other direction, however, the balance staff carried spring engages the cam to move the spring carried contact into engagement with the balance staff carried contact to effectuate an energization of the coil. This contact is then broken after a predetermined period of time as the spring carried contact and the balance staff carried contact are moving in opposite directions to effect a quick and rapid break.

It is accordingly a primary object of the invention to provide an improved contact system for a battery operated electric watch.

It is another object of the invention to provide an improved contact system for a battery operated electric watch which utilizes a pair of spring members, one carried by the balance staff and the other carried by the watch frame or pillar plate.

It is another object of the invention to provide an improved contact system of the foregoing type which provides reliable contact during a known period of oscillation of the balance staff and provides a quick contact break.

Figure 2:
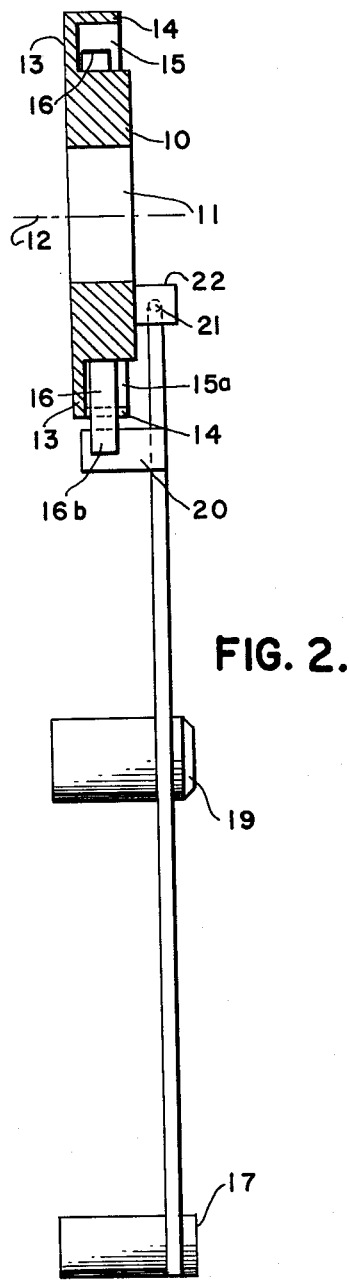

These and other objects and advantages of the invention will become more apparent upon reference to the following specification and claims and appended figures of the drawings wherein:

FIGURE 1 is a diagrammatic plan view showing a contact system constructed according to the present invention; and FIGURE 2 is a vertical section of the contact system of FIGURE 1 taken along the line A—B.

Referring more particularly to the figures of the drawings there is seen a collet 10 having an aperture 11 in the center thereof for receiving the balance staff of a battery operated electric watch.

Referring to FIGURE 2, the collet 10 has an outwardly extending peripheral skirt 13 which terminates in a vertical flange 14 which defines a groove 15 between the flange and the collet 10.

An opening 15a is provided in the flange 14 and extends through about 20–25° of the circumference of the flange.

A single turn spiral spring 16 has its inner end 16a secured to the collet 10 in any suitable fashion and has its outer end 16b extending outwardly through the opening 15a. This spring is so tensed that in its at rest position the end 16b engages the leftmost portion of the cutaway section 15a. The collet 10 also carries a vertically upstanding contact 22.

Mounted on the frame or pillar plate of the watch is a support post 17 carrying an elongated spring 18 which, in its at rest position, engages a stop post 19 also secured to the pillar plate. A triangular shaped jewel 20 depends from the spring 18 and a contact 21 is provided at the end of the spring.

The operation of the contact system is as follows:

Assuming that the balance staff and collet 10 are moving in a counterclockwise direction as indicated by the arrow 23 in FIGURE 1, the end 16b of the spring 16 engages the left side of the jewel 20. As the balance staff and collet continue to rotate, the spring 18 is flexed against the post 19 and the end 16b of spring 16 is forced inwardly in the groove 15, finally springing past the jewel 20. The balance staff and collet 10 continue their rotation in a counterclockwise direction until this is reversed by the hairspring.

As the balance staff and collet 10 now rotate in a clockwise direction, the end 16b of spring 16 engages the right side of the triangular jewel 20 forcing the contact point 21 at the end of the spring 18 into engagement with the contact 22 carried by the collet as is shown by the broken lines at 18′ in FIGURE 1. This causes energization of the coil.

The balance staff and collet 10 then continue their rotation in a clockwise direction until the end 16b slides along the face of the triangular jewel 20 and finally springs free to permit the spring 18 to return to its solid line position in FIGURE 1, thereby breaking the contact between the collet carried contact 22 and spring carried contact 21. At the time that the contact is broken the contact 22 is moving in an opposite direction from the contact 21 so that the break is rapid and minimizes arcing.

The entire contact assembly is simple in construction and operation, provides reliability of contact, accurate control of duration of contact, and rapidity of break.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An electric watch including a balance staff mounted on a stationary support and carrying a member fixed relative to said staff for rotation therewith, an electric contact carried by said fixed member, an elongated spring arm mounted on said stationary support, an electric contact tip near the free end of said spring arm, a lug on said spring arm intermediate its ends, a stop mounted on said stationary support, said spring arm engaging said stop when in its at-rest position, and spring means carried by said fixed member for engaging said lug during rotation of said balance staff in one direction to move said contact tip out of the path of said contact, and to engage said lug during rotation of said balance staff in the opposite direction to move said contact tip into engagement with said contact, said contact tip and said contact moving in the same direction at the time of engagement, said spring arm being carried away from said stop during the engagement of said contact tip with said contact.

2. An electric watch as defined in claim 1 wherein said fixed member is a disc having an annular groove on one of its faces, the wall surrounding said groove having an opening therein, said spring being mounted in said groove, one end of said spring being fixed, the other end of said spring projecting out of the opening in said wall and engaging said lug on said spring arm to alternatively move said contact tip out of the path of said contact and into engagement with said contact during each pair of oscillations of said balance staff as set forth in claim 1.

3. An electric watch as defined in claim 2, wherein said fixed member is the collet of the balance wheel assembly.

4. An electric watch as defined in claim 3 wherein said contact is closer to the balance staff than the other end of said spring and is positioned at the time of contact engagement along a radius leading the radius on which said contact tip is positioned while the balance staff is moving in the direction in which said contact tip comes in contact with said contact.

References Cited in the file of this patent
UNITED STATES PATENTS

| 2,644,293 | Black | July 7, 1953 |
| 2,806,908 | Van Horn et al. | Sept. 17, 1957 |

FOREIGN PATENTS

| 748,565 | France | Apr. 18, 1933 |
| 1,134,560 | France | Dec. 3, 1956 |